US 9,056,416 B2

(12) United States Patent
Ikeda et al.

(10) Patent No.: US 9,056,416 B2
(45) Date of Patent: Jun. 16, 2015

(54) INJECTION MOLDING APPARATUS

(71) Applicant: Nissei Plastic Industrial Co., Ltd., Nagano (JP)

(72) Inventors: Toru Ikeda, Nagano (JP); Hiroo Okubo, Nagano (JP); Akira Obinata, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 13/890,576

(22) Filed: May 9, 2013

(65) Prior Publication Data

US 2013/0309350 A1   Nov. 21, 2013

(30) Foreign Application Priority Data

May 16, 2012   (JP) .................................. 2012-112689

(51) Int. Cl.
| | |
|---|---|
| *B29C 45/06* | (2006.01) |
| *B29C 45/82* | (2006.01) |
| *B29C 45/40* | (2006.01) |
| *B29C 45/67* | (2006.01) |
| B29C 31/04 | (2006.01) |
| B29C 45/76 | (2006.01) |
| B29C 31/02 | (2006.01) |

(52) U.S. Cl.
CPC ............ *B29C 45/4005* (2013.01); *B29C 31/04* (2013.01); *B29C 45/67* (2013.01); *B29C 45/7666* (2013.01); *B29C 45/82* (2013.01); *B29C 45/062* (2013.01); *B29C 2045/822* (2013.01); *B29C 31/02* (2013.01)

(58) Field of Classification Search
CPC .. B29C 45/04; B29C 45/0441; B29C 45/045; B29C 45/10; B29C 45/12; B29C 45/13; B29C 45/07; B29C 45/076; B29C 45/06; B29C 45/062; B29C 45/67; B29C 45/82; B29C 2045/822; B29C 31/04; B29C 45/7666; B29C 45/4005
USPC .......................................... 425/149, 576, 588
See application file for complete search history.

(56) References Cited

U.S. PATENT DOCUMENTS

| | | | | |
|---|---|---|---|---|
| 2,289,102 | A | * | 7/1942 | Clark, Jr. ....................... 425/351 |
| 2,309,758 | A | * | 2/1943 | Ernst ............................... 60/459 |
| 2,451,301 | A | * | 10/1948 | O'Connell ..................... 425/140 |

(Continued)

FOREIGN PATENT DOCUMENTS

| | | | | | |
|---|---|---|---|---|---|
| JP | 06055569 | A | * | 3/1994 | .............. B29C 45/06 |
| JP | 06218763 | A | * | 8/1994 | .............. B29C 45/14 |

(Continued)

*Primary Examiner* — Yogendra Gupta
*Assistant Examiner* — Emmanuel S Luk
(74) *Attorney, Agent, or Firm* — Adams & Wilks

(57) ABSTRACT

An injection molding apparatus has at least two mold clamping mechanisms for clamping respective molds. A hydraulic pressure supply source supplies hydraulic pressure to the at least two mold clamping mechanisms to clamp the respective molds. A a hydraulic-pressure-supply-destination selection section is configured to allow hydraulic pressure from the hydraulic pressure supply source to be selectively supplied to any one of the two mold clamping mechanisms. At least two injecting machines are configured to inject resin material to the respective molds clamped by the respective two mold clamping mechanisms. A non-hydraulic power supply source drives the at least two injecting machines to inject the resin material.

20 Claims, 9 Drawing Sheets

(56) References Cited

U.S. PATENT DOCUMENTS

| | | | |
|---|---|---|---|
| 2,471,139 A * | 5/1949 | Benander et al. | 425/185 |
| 2,830,323 A * | 4/1958 | Krebs, Jr. et al. | 425/544 |
| 3,407,443 A * | 10/1968 | Beebee et al. | 425/547 |
| 3,482,284 A * | 12/1969 | Rees | 425/130 |
| 3,574,894 A * | 4/1971 | Aoki | 425/576 |
| 3,765,815 A * | 10/1973 | Hunt | 425/550 |
| 3,833,329 A * | 9/1974 | Ulmachneider et al. | 425/556 |
| 4,144,010 A * | 3/1979 | Fenner | 425/125 |
| 4,186,161 A * | 1/1980 | Ulmschneider et al. | 264/37.33 |
| 4,483,046 A * | 11/1984 | Briddell | 425/556 |
| 4,652,227 A * | 3/1987 | Aoki | 425/191 |
| 4,744,742 A * | 5/1988 | Aoki | 425/126.1 |
| 5,211,798 A * | 5/1993 | Keller | 156/500 |
| 5,286,186 A * | 2/1994 | Brown et al. | 425/144 |
| 5,320,511 A * | 6/1994 | Woerner | 425/130 |
| 5,435,715 A * | 7/1995 | Campbell | 425/576 |
| 5,580,585 A * | 12/1996 | Holzschuh | 425/145 |
| 5,613,361 A * | 3/1997 | Dantlgraber et al. | 60/427 |
| 5,654,017 A * | 8/1997 | Harmsen | 425/116 |
| 5,855,935 A * | 1/1999 | Brent et al. | 425/574 |
| 5,881,639 A * | 3/1999 | Nesheim et al. | 99/455 |
| 5,882,553 A * | 3/1999 | Prophet et al. | 264/1.7 |
| 5,971,737 A * | 10/1999 | Sharp | 425/145 |
| 6,089,849 A * | 7/2000 | Bulgrin et al. | 425/149 |
| 6,257,859 B1 * | 7/2001 | Koda et al. | 425/145 |
| 6,280,170 B1 * | 8/2001 | Furuya et al. | 425/145 |
| 6,772,589 B2 * | 8/2004 | Schienbein et al. | 60/421 |
| 6,868,305 B2 * | 3/2005 | Choi et al. | 700/200 |
| 7,597,834 B2 * | 10/2009 | DeSimone | 264/297.3 |
| 8,168,097 B2 * | 5/2012 | Hakoda et al. | 264/40.5 |
| 8,226,403 B2 * | 7/2012 | Stengrimsen | 425/576 |
| 8,641,399 B2 * | 2/2014 | Mucibabic et al. | 425/135 |
| 2002/0051830 A1 * | 5/2002 | Takikawa et al. | 425/112 |
| 2002/0071886 A1 * | 6/2002 | Asai et al. | 425/543 |
| 2003/0042640 A1 * | 3/2003 | Kubota | 264/40.1 |
| 2008/0251974 A1 * | 10/2008 | Simone | 264/538 |
| 2010/0283186 A1 * | 11/2010 | Notz | 264/328.1 |
| 2012/0090308 A1 * | 4/2012 | Yuan et al. | 60/327 |
| 2012/0248654 A1 * | 10/2012 | Van Eerde et al. | 264/328.19 |
| 2013/0061938 A1 * | 3/2013 | Jiang et al. | 137/14 |
| 2013/0230618 A1 * | 9/2013 | Lee et al. | 425/588 |
| 2013/0249144 A1 * | 9/2013 | Carlson et al. | 264/328.8 |
| 2014/0130912 A1 * | 5/2014 | Yamaguchi | 137/565.17 |

FOREIGN PATENT DOCUMENTS

| | | | | |
|---|---|---|---|---|
| JP | 07256690 A | * | 10/1995 | B29C 45/13 |
| JP | 2003320545 | | 11/2003 | |
| JP | 2012025044 A | * | 2/2012 | B29C 45/06 |

* cited by examiner

INJECTION MOLDING APPARATUS

FIELD OF THE INVENTION

The present invention relates to an injection molding apparatus provided with a plurality of mold clamping mechanisms.

BACKGROUND OF THE INVENTION

Many of the injection molding apparatus known today include one mold clamping mechanism and one injection molding machine, and they are constructed in such a manner that resin material is injected into an injection mold, clamped by the mold clamping mechanism, to obtain a molded part or workpiece. However, the known injection molding apparatus have limitations in terms of productivity. Thus, there have been proposed injection molding apparatus that include a plurality of mold clamping mechanisms and a plurality of injecting machines, one example of which is disclosed in Japanese Patent Application Laid-open Publication No. 2003-320545 that will hereinafter be referred to as "the relevant patent literature" (see particularly FIGS. 1 and 2 of the relevant patent literature).

The injection molding apparatus disclosed in the relevant patent literature includes, as shown in FIGS. 1 and 2 of the relevant patent literature, two injecting machines, two mold clamping mechanisms, one oil tank and one hydraulic pump. One of the injecting machines is driven by a hydraulic cylinder provided as an injecting cylinder, one of the mold clamping mechanisms is driven by a hydraulic cylinder provided as a mold clamping cylinder, the other of the injecting machines is driven by a hydraulic cylinder provided as another injecting cylinder, and the other of the mold clamping mechanisms is driven by a hydraulic cylinder provided as another mold clamping cylinder. Hydraulic pressure is supplied from the hydraulic pump to all of the above-mentioned four hydraulic cylinders.

Because the four hydraulic cylinders are sometimes driven simultaneously, the hydraulic pump has a capacity capable of simultaneously driving the four hydraulic cylinders. Therefore, the hydraulic pump would unavoidably become large in size and costly, but also an amount of electric power to be supplied to an electric motor for driving the hydraulic pump would increase and thus electricity cost would increase.

In actual operation of such an injection molding apparatus, all of the hydraulic cylinders are sometimes driven simultaneously, and only one or some of the hydraulic cylinders are sometimes driven. However, even in the case where only one or some of the hydraulic cylinders are driven, considerable electricity cost would be required for driving the large hydraulic pump. Therefore, there has been a demand for an improved technique capable of downsizing the hydraulic pump in order to achieve energy saving or conservation and cost reduction of the injection molding apparatus.

SUMMARY OF THE INVENTION

In view of the foregoing prior art problems, it is an object of the present invention to provide an improved technique which, in an injection molding apparatus provided with a plurality of hydraulic-type mold clamping mechanisms, can downsize a hydraulic pressure supply source that drives the mold clamping mechanisms.

In order to accomplish the above-mentioned object, the present invention provides an improved injection molding apparatus, which comprises: a plurality of mold clamping mechanisms; a single hydraulic pressure supply source provided for supplying mold clamping hydraulic pressure to the plurality of mold clamping mechanisms; a hydraulic-pressure-supply-destination selection section for making a hydraulic-pressure supply destination selection such that hydraulic pressure is supplied from the hydraulic pressure supply source to any one of the plurality of mold clamping mechanisms; a turntable for shifting injection molds, disposed thereon, between the mold clamping mechanisms; a plurality of injecting machines provided in association with respective ones of the plurality of mold clamping mechanisms for injecting resin material to the injection molds clamped by the corresponding mold clamping mechanisms; and an electric power supply source or a compressed air supply source provided for supplying driving electric power or compressed air to the plurality of injecting machines.

In the injection molding apparatus of the present invention, including the plurality of mold clamping mechanisms and the plurality of injecting machines, the mold clamping mechanisms are driven by hydraulic pressure while the injecting machines are driven by electric power or compressed air. In the case where only the mold clamping mechanisms are driven by hydraulic pressure like this, the necessary capacity of the hydraulic pressure supply source can be lowered as compared to a case where all of the mold clamping mechanisms and the injecting machines are driven by hydraulic pressure.

Further, in the injection molding apparatus of the present invention, the hydraulic-pressure-supply-destination selection section allows hydraulic pressure to be supplied to a selected one of the mold clamping mechanisms. In the case where only a selected one of the mold clamping mechanisms is driven at a time like this, the necessary capacity of the hydraulic pressure supply source can be halved as compared to a case where the plurality of mold clamping mechanisms are driven simultaneously. Thus, the present invention can significantly lower or reduce the necessary capacity of the hydraulic pressure supply source and thus can reduce the size of, or downsize, the hydraulic pressure supply source but also significantly reduce electricity cost required for driving the hydraulic pressure supply source.

Preferably, the injection molding apparatus of the present invention further comprises an ejection mechanism for ejecting a molded product from the injection mold, and the driving electric power or compressed air is supplied from the electric power supply source or the compressed air supply source to the ejection mechanism. Because driving by hydraulic pressure is not employed for the ejection mechanism, it is not necessary to increase the capacity of the hydraulic pressure supply source, so that further size reduction or downloading of the hydraulic pressure supply source can be achieved.

Preferably, in the injection molding apparatus of the present invention, the hydraulic pressure supply source is a hydraulic pump, a discharge flow rate of the hydraulic pump being variable by the number of rotations of a drive motor that drives the hydraulic pump being variably controlled. If a servo motor is used as the drive motor, the present invention can achieve enhanced energy conservation performance, reduced running cost and enhanced responsiveness of the hydraulic pump, but also enhanced accuracy and precision of control of the injection molding apparatus.

Preferably, in the injection molding apparatus of the present invention, the resin material to be injected by one of the injecting machines is thermoplastic resin, while the resin material to be injected by another of the injecting machines is non-thermoplastic resin different from the thermoplastic resin. By the provision of the hydraulic-pressure-supply-destination selection section, mold clamping by the one mold clamping mechanism and mold clamping by the other mold clamping mechanism can be performed with a proper time difference therebetween or at proper non-overlapping timing, and mold opening by the one mold clamping mechanism and mold opening by the other mold clamping mechanism can be performed with a proper time difference therebetween or at proper non-overlapping timing. Thus, even different kinds of material that differ from each other in length of time necessary for being cooled within the respective molds can be used for injection molding by the injection molding apparatus of the invention, and thus, double-color molding etc. can be performed with ease by the injection molding apparatus of the invention.

Further, preferably, in the injection molding apparatus of the present invention, the non-thermoplastic resin is liquid mixed material obtained by stirring and mixing liquid resin material and a curing agent. Although the thermoplastic resin and the liquid resin material completely differ from each other in the necessary cooling time, such different kinds of material used for injection molding by the injection molding apparatus of the invention.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
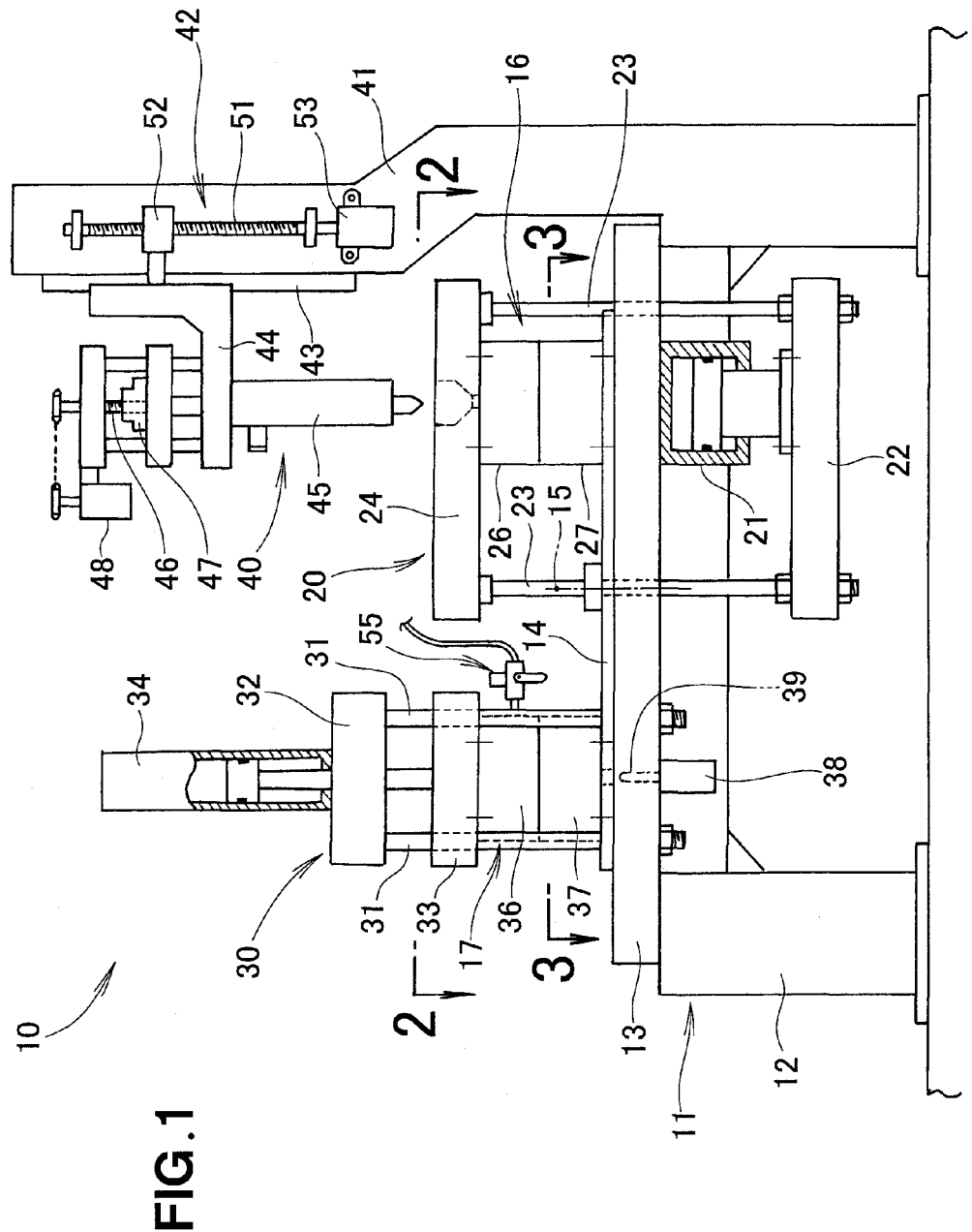
FIG. 1 is a front view of an embodiment of an injection molding apparatus of the present invention.

As shown in FIG. 1, an embodiment of an injection molding apparatus 10 of the present invention includes: a machine stand 11 having a leg 12 and an upper board 13; a turntable 14 pivotably provided on the upper board 13; first and second injection molds 16 and 17 disposed symmetrically with respect to a pivot shaft 15 of the turntable 14; first and second mold clamping mechanisms 20 and 30 for clamping the molds 16 and 17, respectively; a first injecting machine 40 provided in association with the first mold clamping mechanism 20 for injecting resin material to the mold 16; and a second injecting machine 55 provided in association with the second mold clamping mechanism 30 for injecting resin material to the mold 17.

Whereas two mold clamping mechanisms 20 and 30 are provided on the machine stand 11 in the illustrated example, three or more mold clamping mechanisms may be provided on the machine stand 11, and three or more injecting machines rather than the two injecting machines 40 and 55 may be provided in association with the three or more mold clamping mechanisms.

The first mold clamping mechanism 20 includes: a mold clamping cylinder (hereinafter referred to as "first mold clamping cylinder") 21 mounted to the underside of the upper board 13; a pressure receiving board (hereinafter referred to as "first pressure receiving board") 22 disposed under the upper board 13 and drivable by the first mold clamping cylinder 21; tie rods 23 extending upward from the first pressure receiving board 22 to pass through the upper board 13; and a movable plate (hereinafter referred to as "first movable plate") 24 secured to and connecting the respective upper ends of the tie rods 23.

As the first mold clamping cylinder 21 is extended, the first movable plate 24 moves downward or descends so that the mold 16 is clamped between the turntable 14, functioning also as a stationary plate, and the first movable plate 24.

The mold 16 comprises a movable mold (hereinafter referred to as "first movable mold") 26 mounted to the first movable plate 24, and a stationary mold (hereinafter referred to as "first stationary mold") 27 mounted to the turntable 14. A pneumatic ejection mechanism is mounted to the first movable mold 26, as will be detailed later.

The second mold clamping mechanism 30 includes: tie rods 31 extending upward from the upper board 13; a pressure receiving board (hereinafter referred to as "second pressure receiving board") 32 secured to and connecting the respective upper ends of the tie rods 31; a movable plate (hereinafter referred to as "second movable plate") 33 connected to the tie rods 31 for movement between the turntable 14 functioning also as the stationary plate and the second pressure receiving board 32; and a mold clamping cylinder (hereinafter referred to as "second mold clamping cylinder") 34 connected to the second pressure receiving board 32 for moving the second movable plate 33.

As the second mold clamping cylinder 34 is extended, the second movable plate 33 moves downward or descends so that the mold 17 is clamped between the turntable 14, functioning also as the stationary plate, and the second movable plate 33.

The mold 17 comprises a movable mold (hereinafter referred to as "second movable mold") 36 mounted to the second movable plate 33, and a stationary mold (hereinafter referred to as "second stationary mold") 37 mounted to the turntable 14.

In a lower position beneath the second mold clamping mechanism 30, an electric ejection mechanism 38 is mounted to the upper board 13. A projecting pin 39 of the electric ejection mechanism 38, which is located beneath the turntable 14 in a standby state, moves upward, in response to an ejection instruction, through the turntable 14 and the second stationary mold 37 and thereby pushes a molded part or workpiece upward from the second stationary mold 37. A pneumatic ejection mechanism is mounted to the second movable mold 33, as will be detailed later.

The first injecting machine 40 is an electric injecting machine that includes: an injection unit moving mechanism (hereinafter referred to as "first injection unit moving mechanism") 42 mounted on a support post 41 extending upward from the upper board 13; a slider 44 vertically movably fitted over a rail 43 fixed to and extending along the support post 41 and drivable by the first injection unit moving mechanism 42; a heating cylinder 45 extending downward from the slider 44 and having a screw provided therein; a ball thread shaft 46 for moving the screw forward and backward; a nut 47; and a screw moving electric motor 48.

The first injection unit moving mechanism 42 includes a feed screw shaft 51 rotatably supported on the support post 41, a nut 52 screwed on the feed screw 51 and operatively connected to the slider 44, and a first injection unit moving electric motor 53 for rotating the feed screw 51.

The second injecting machine 55 in the instant embodiment is of another type than the electric type as will be later detailed, although it may be an electric injecting machine like the first injecting machine 40.

Figure 2:
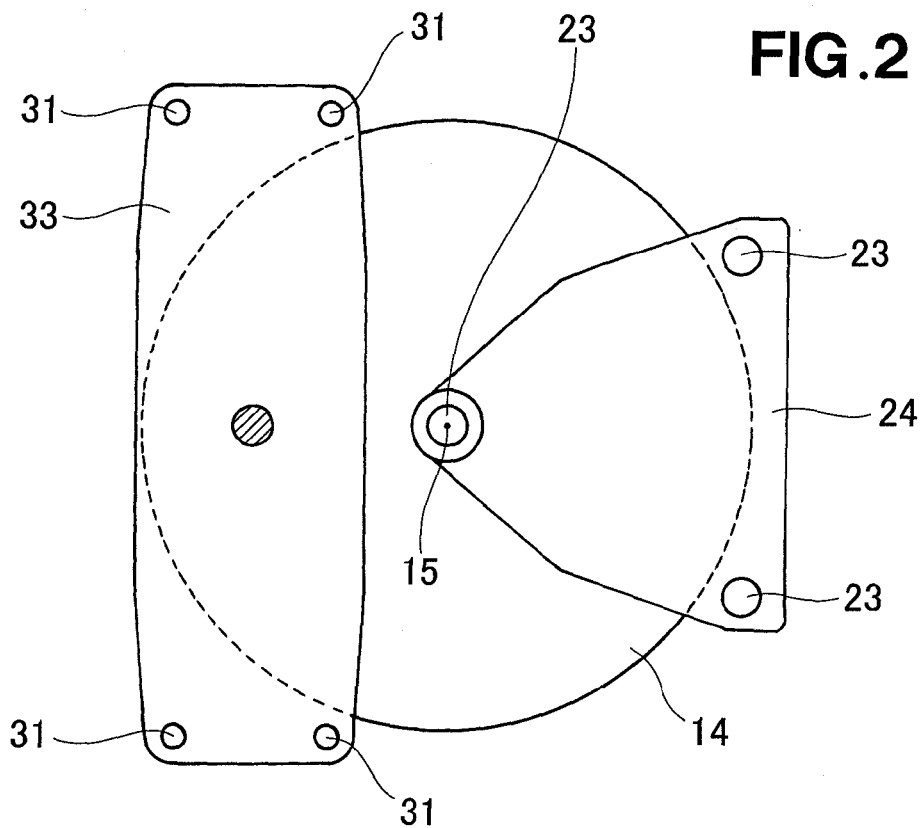
FIG. 2 is a view taken along arrowed line 2-2 of FIG. 1.

As shown in FIG. 2, the first movable plate 24, which has a substantially triangular shape as viewed in plan, has three tie rods 23 disposed respectively at three apex portions of the triangle, and one of the three tie rods 23 is located at the pivot center 15 of the turntable 14. Because the remaining two tie rods 23 are located away from the turntable 14, pivoting movement of the turntable 14 would not be disturbed by the rods 23.

Further, the second movable plate 33, which has a rectangular shape as viewed in plan, has four tie rods 31 disposed respectively at four apex portions of the rectangle, and all of the four tie rods 31 are located away from the turntable 14, so that pivoting movement of the turntable 14 would not be disturbed by the rods 31.

Figure 3:
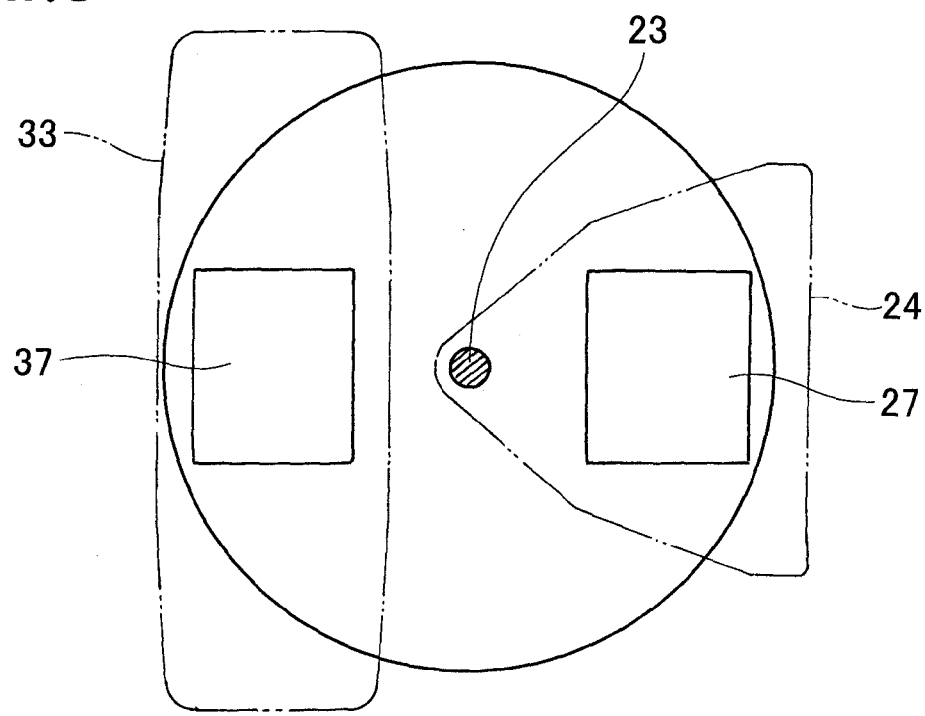
FIG. 3 is a view taken along arrowed line 3-3 of FIG. 1.

Further, as shown in FIG. 3, the first stationary mold 27 is disposed under and clampable by the first movable plate 24 indicated by an imaginary line, while the second stationary mold 37 is disposed under and clampable by the second movable plate 33 indicated by an imaginary line.

In response to pivoting movement of the turntable 14, the first stationary mold 27 angularly moves between a position under the first movable plate 24 and a position under the second movable plate 33. Similarly, in response to pivoting movement of the turntable 14, the second stationary mold 37 angularly moves between a position under the second movable plate 33 and a position under the first movable plate 24.

Figure 4:
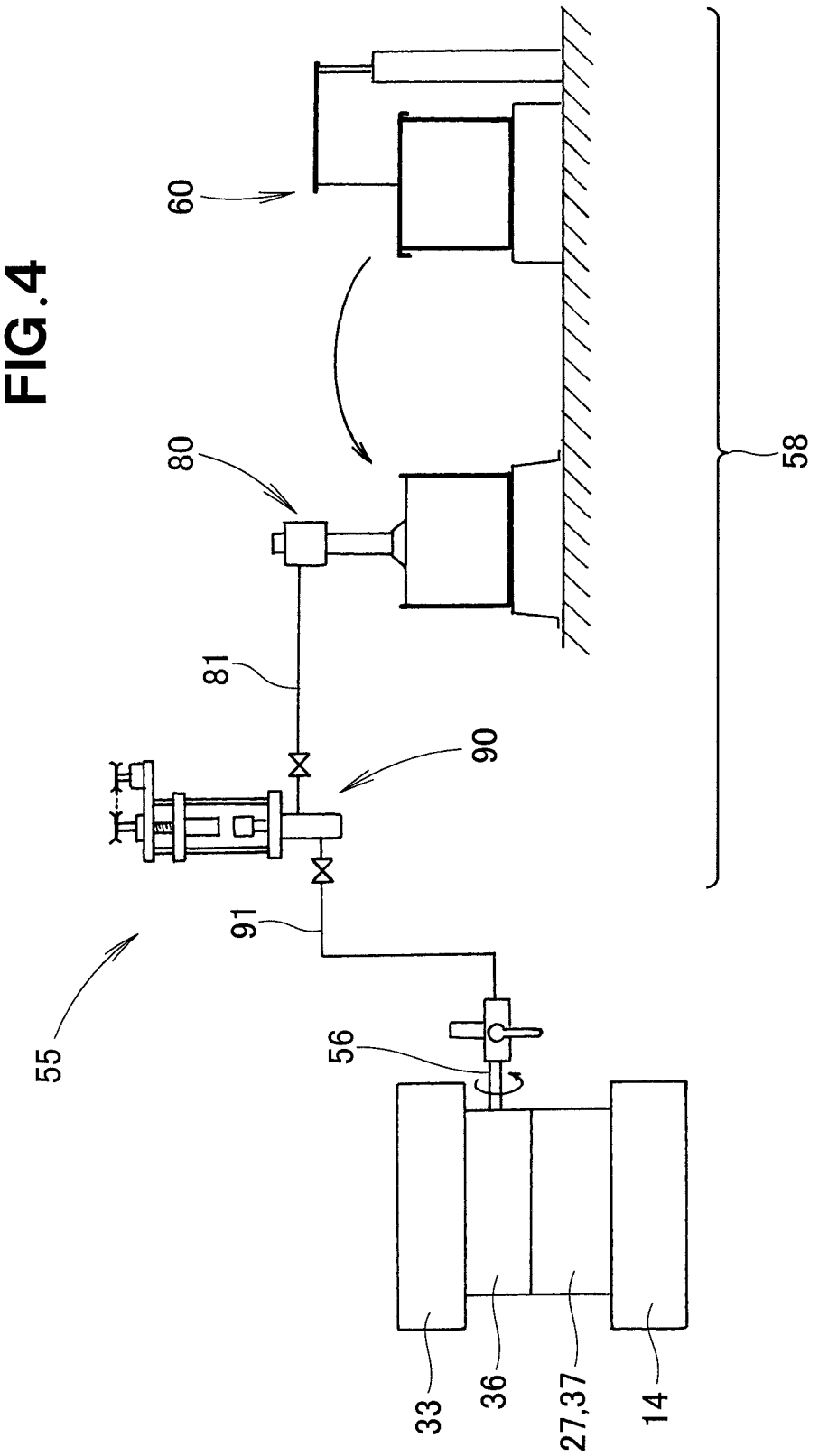
FIG. 4 is a view illustrating principles of a second injecting machine in the injection molding apparatus of the present invention.

The following detail a construction of the second injecting machine 55. As shown in FIG. 4, the second injecting machine 55 includes a nozzle 56 screwed into the second movable mold 36, and a material feed device 58 for feeding or supplying liquid material into the nozzle 56.

The material feed device 58 includes: a stirring and mixing mechanism 60 for sufficiently stirring (or agitating) and mixing liquid resin material comprising base resin and an additive agent, such as a curing agent, added to the base resin; a pump mechanism 80 for pressure-feeding the stirred and mixed liquid resin material; and a measure and supply mechanism 90 for measuring a predetermined amount of the liquid resin material to intermittently supplying the liquid resin material to the second movable mold 36 via a second flow path 91.

Figure 5:
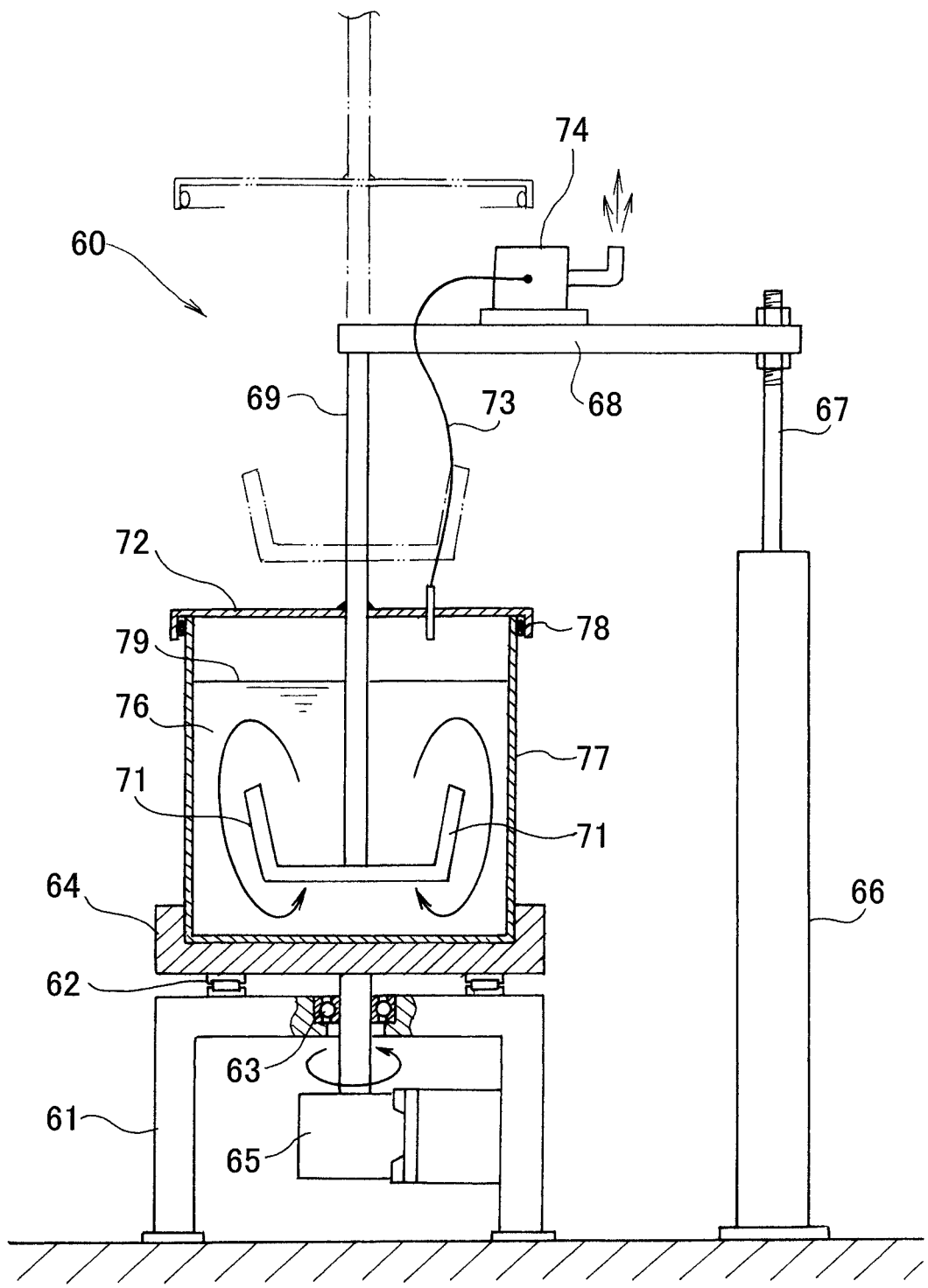
FIG. 5 is a view illustrating principles of a stirring and mixing mechanism in the injection molding apparatus of the present invention.

As shown in FIG. 5, the stirring and mixing mechanism 60 includes: a base 61, a rotary table 64 rotatably mounted on the base 61 via a thrust bearing 62 and a radial bearing 63; a speed-reducer-equipped motor 65 mounted on the base 61 for rotating the rotary table 64; a cylinder 66 vertically provided laterally of the base 61; a horizontal bar 68 fixed to a piston rod 67, extending upward from the cylinder 66, and extending horizontally; a rod 69 extending vertically downward from the distal end of the horizontal bar 68; anchor-shaped stirring blades 71 fixed to the lower end of the rod 69; a lid 72 fixed to a halfway position of the rod 69; a flexible hose 73 extending from the lid 72; and a vacuum pump 74 connected to the distal end of the flexible hose 73. Whereas the vacuum pump 74 is shown as placed on the horizontal bar 68, the vacuum pump 74 may be installed at any other desired position.

A container 77 containing the liquid resin material 76 comprising the base resin and the additive agent, such as a curing agent, added to the base resin is placed on the rotary table 64. Then, with the stirring blades 71 submerged in the liquid resin material 76, the rod 69 is lowered until an upper opening of the container 77 is closed with the lid 72. Because the lid 72 has a seal member attached thereto the lid, the container 77 is tightly sealed with the lid 72.

The rotary table 64 is rotated by the motor 65 at a rate of one rotation per second, in response to which the container 77 rotates relative to the blades 71 kept in a stationary state, so that the liquid resin material 76 rotates with the container 77. At the same time, the interior pressure of the container 77 is lowered by the vacuum pump 74 to a negative pressure (lower than the atmospheric pressure).

Because of a difference in relative rotation between the container 77 and liquid resin material 76, vertical (or up-down) circulating flows are produced in the liquid resin material 76 in addition to flows about the rod 69. With such three-dimensional flows of the liquid resin material 76, the additive agent is uniformly mixed into the base resin. Air bubbles contained in the liquid resin material 76 are pushed upward to the liquid level 79 by the vertical circulating flows. Because a space between the lid 72 and the liquid level 79 is under the negative pressure, the air bubbles go upward from the liquid level 79 toward the vacuum pump 74.

The stirring and mixing mechanism 60, which is called a "vacuum stirring and mixing device", removes the air bubbles by vacuum and promotes mixing by stirring. Upon completion of the stirring and mixing (including deaeration) of a predetermined time length, the container 77 is transferred to a next step. Then, the pump mechanism 80 is attached to the transferred container 77.

Figure 6:
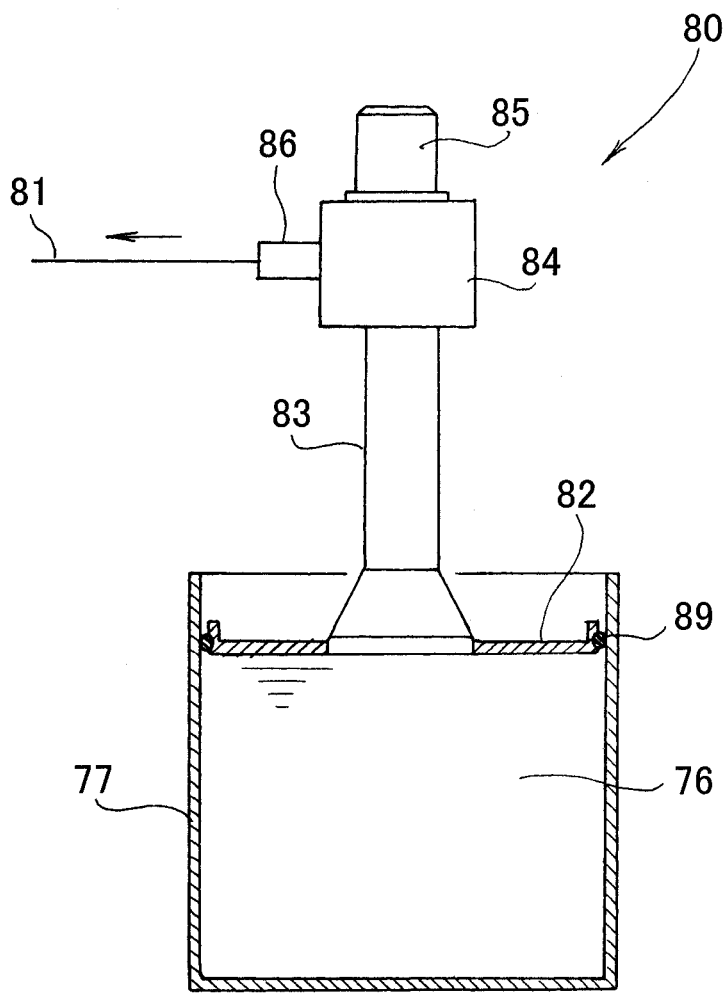
FIG. 6 is a view illustrating principles of a pump mechanism in the injection molding apparatus of the present invention.

As shown in FIG. 6, the pump mechanism 80 includes: a circular plate 82 of a small lid shape; an intake tube 83 projecting from the center of the circular plate 82; a pump casing 84 connected to the upper end of the intake tube 83; a pump motor fixed to the upper surface of the pump casing 84 for rotating pump impellors, built in the pump casing 84, at a high speed; and a discharge tube 86 extending laterally from the pump casing 84.

The content of the container 77 is the liquid resin material 76 having been sufficiently mixed. The circular plate 82 is inserted from above into the container 77 and placed on the upper surface (liquid level) of the liquid resin material 76. The circular plate 82 has a seal member 89, such as an O-ring, attached thereto, so that it is tightly fitted along the inner peripheral surface of the container 77. Then, the pump motor 85 is activated, and the liquid resin material 76 is discharged through the discharge tube 86. Although the upper surface (liquid level) of the liquid resin material 76 lowers in response to the discharge of the liquid resin material 76 through the discharge tube 86, outside air can be reliably prevented from entering under the circular plate 82 because the circular plate 82 moves downward together with the upper surface (liquid level) of the liquid resin material 76, and thus, air can be reliably prevented from mixing into the liquid resin material 76.

Figure 7:
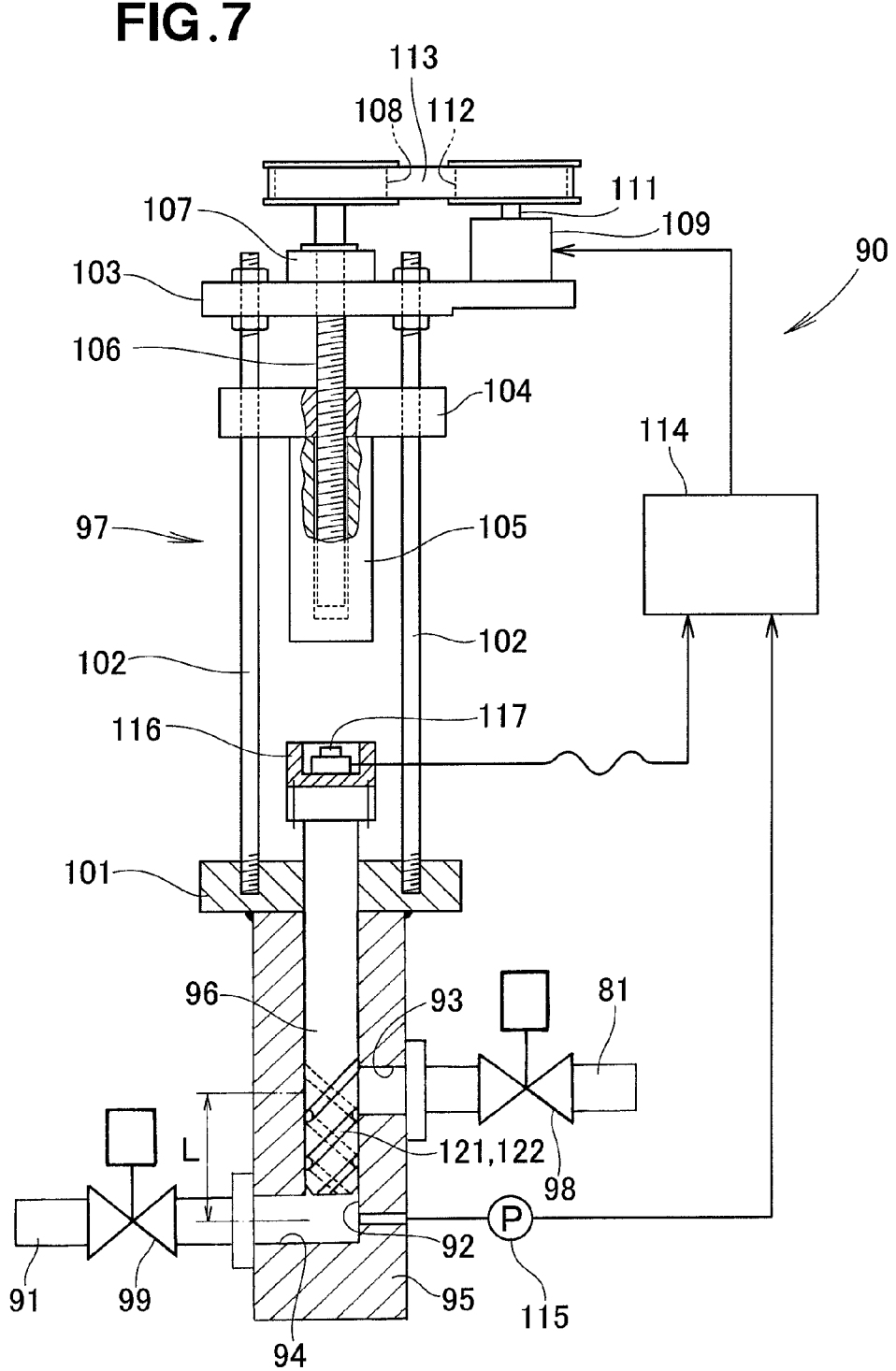
FIG. 7 is a view illustrating principles of a measure and supply mechanism in the injection molding apparatus of the present invention.

The liquid resin material 76 is pressure-fed by the pump mechanism 80 to the measure supply mechanism 90 via a first flow path 81. As shown in FIG. 7, the measure supply mechanism 90 includes: a body section 95 having a pot portion 92 for storing the liquid resin material, an inlet 93 for introducing the liquid resin material 76 into the pot portion 92, and an outlet 94 for discharging the liquid resin material from the pot portion; a plunger 96 movably mounted to the body section 95 in such a manner that it retracts (ascends in the illustrated example) due to pressure of the liquid resin material having accumulated in the pot portion 92; a plunger pusher 97 provided in the body section 95 for pushing forward or advancing the plunger 96; an inflow valve 98 provided in the first flow path 81 for blocking or permitting flows of the liquid resin material; and an outflow valve 99 provided in the second flow path 91 for blocking or permitting flows of the liquid resin material.

The plunger pusher 97 includes: a bracket 101 provided on an upper portion of the body section 95; a plurality of rods 102 extending upward from the bracket 101; a top plate 103 fixed to the upper ends of the rods 102; a nut 104 provided under the top plate 103 for being guided by the rods 102; a piston rod 105 formed integrally with the nut 104; a feed screw 106 screwed through the nut 104 to extend upward; a thrust bearing 107 provided on the top plate 103 to rotatably support an upper portion of the feed screw 106; a driven pulley 108 mounted on the upper end of the feed screw 106; a servo motor 109 provided on the top plate 103; a drive pulley 112 mounted on the motor shaft 111 of the servo motor 109; a belt 113 operatively interconnecting the drive pulley 112 and the driven pulley 108; and a control section 114 for controlling the servo motor 109.

A pressure meter 115 for measuring pressure of the liquid resin material near the outlet 94 is mounted to the body section 95 of the measure supply mechanism 90. Further, an accommodating case 116 is fixed to the upper end of the plunger 96, and a proximity sensor 117 for detecting a state of contact between the piston rod 105 and the case 116 is accommodated in the case 116.

The above-mentioned inlet 93 is offset, in the axial direction of the plunger 96, from the outlet 94 toward the plunger pusher section 97 by a distance L. Further, the plunger 96 has a material flow path 121 formed therein for directing the liquid resin material, supplied via the inlet 93, even to the distal end of the plunger 96 when the plunger 96 is in its most advanced position. Such a material flow path 121 is preferably in the form of a helical groove 122 formed in the outer peripheral surface of the plunger 96. The helical groove 122 can eliminate a possibility of the plunger 96 being subjected to force acting in a direction substantially normal to the plunger 96 and thus can decrease frictional sliding resistance between the plunger 96 and the body section 95. Also, the helical groove 122 can have a greater flow path resistance than a linear groove and thereby prevent unwanted flow-back of the liquid resin material.

The following describe behavior of the measure and supply mechanism 90 constructed in the aforementioned manner. The piston rod 105 stands by at a predetermined position, i.e. at a preset measure-completed position. Once the accommodating case 116 contacts the piston rod 105 in response to the plunger 96 being pushed upward by the liquid resin material, the contact between the accommodating case 116 and the piston rod 105 is detected by the proximity sensor 117, so that it is detected that the plunger 96 has reached a predetermined position. If there is any concern that false detection may be made by the proximity sensor 117, detection by the proximity sensor 117 and measurement of a predetermined time interval may be used in combination to prevent such false detection. In an alternative, the proximity sensor 117 may be replaced with a high-precision position detection means. Once the plunger 96 having reached predetermined position is detected, it is determined that the measurement of the predetermined amount of the liquid resin material has been completed.

Then, the inflow valve 98 is closed, while the outflow valve 99 is opened. The piston rod 105 is lowered by the servo motor 109 producing first torque that is predetermined torque. Then, the plunger 96 advances so that the liquid resin material is supplied to the mold via the second flow path 91. During the supply of the liquid resin material, pressure of the liquid resin material is measured by the pressure meter 115, and the thus-measured pressure of the liquid resin material is sent to the control section 114.

Once the pressure of the liquid resin material reaches a predetermined pressure level, the control section 114 changes the torque of the servo motor 109 to second torque smaller than the first torque and then controls the pressure of the liquid resin material. Such control is called "follow-up pressure control". When the plunger 96 has advanced to its advance limit position or when the liquid resin material supply time has reached a predetermined time length, injection of the liquid resin material supply time into the mold cavity is completed.

Next, a description will be given about a drive system for the embodiment of the injection molding apparatus of the present invention.

Figure 8:
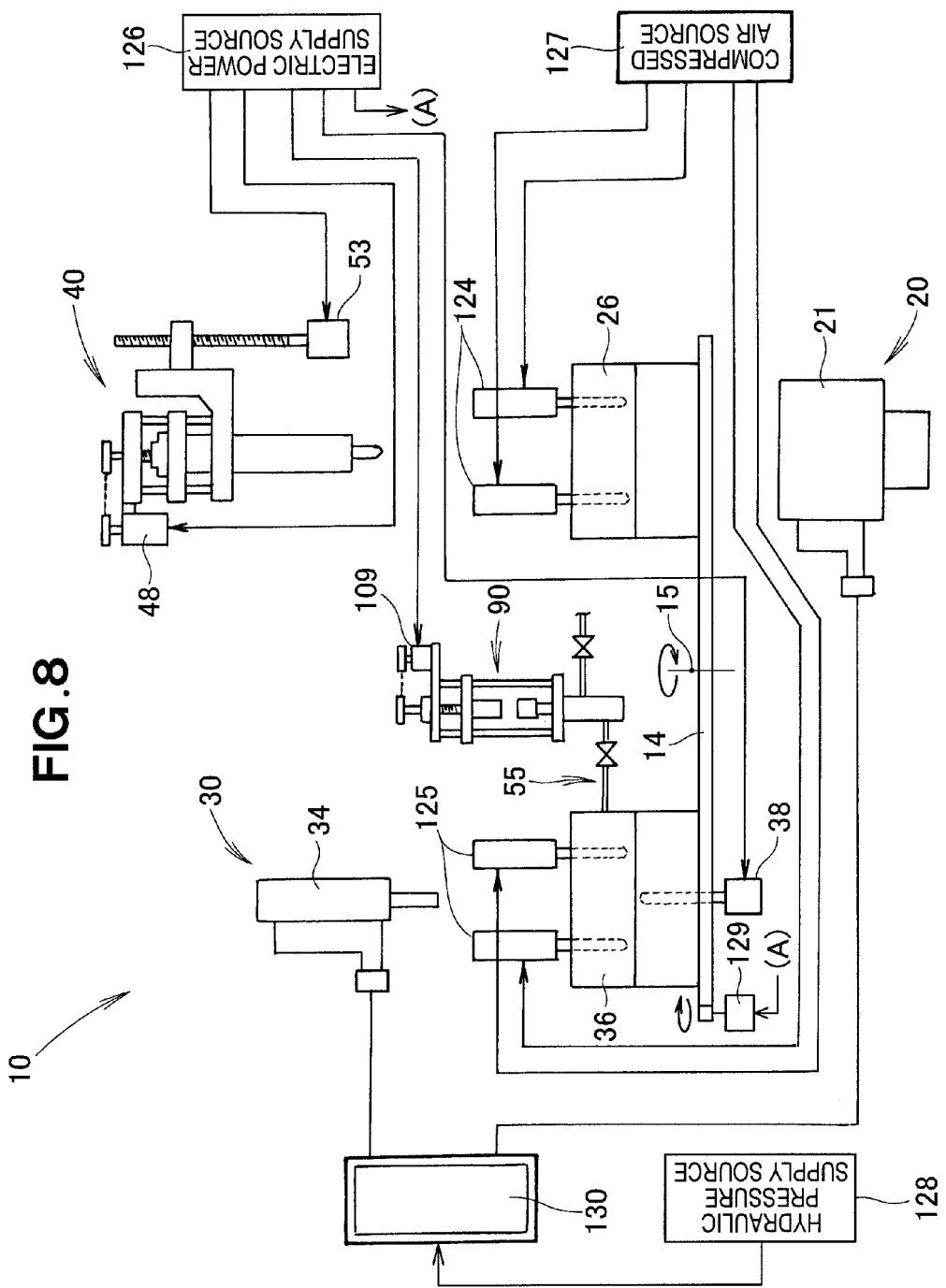
FIG. 8 is a view illustrating principles of a plurality of types of drive sources for driving the injection molding apparatus of the present invention.

As shown in FIG. 8, pneumatic ejection mechanisms 124 for pushing down a molded product are provided for the first movable mold 26, while pneumatic ejection mechanisms 125 for pushing down a molded product are provided for the second movable mold 36. Note that the pneumatic ejection mechanisms 124 and 125 may be in the form of pneumatic-hydraulic cylinders rather than pneumatic cylinders. The pneumatic-hydraulic cylinder is also called "air-hydro cylinder", which is a special cylinder where oil is compressed by a piston rod of an air cylinder so as to supply the compressed oil to a hydraulic cylinder. Because the oil is an incompressible fluid, the piston rod of the hydraulic cylinder does not change in position even when subjected to load variation. Further, in this case, no hydraulic pressure source is required because what has to be supplied is compressed air.

The instant embodiment of the injection molding apparatus 10 further includes, as drive sources, an electric power supply source 126, a compressed air supply source 127 and a single hydraulic pressure supply source 128. From the electric power supply source 126, electric power is supplied to the first injection unit moving electric motor 53, screw moving electric motor 48, servo motor 109, electric ejection mechanism 38 and turntable drive motor 129.

The compressed air supply source 127 includes an air compressor, and a reserve tank for reserving compressed air, and compressed air is supplied from the compressed air supply source 127 to the pneumatic ejection mechanisms 124 and 125. The hydraulic pressure supply source 128 includes an oil tank for storing return oil and a hydraulic pump for pumping and pressure-feeding oil, as will be later detailed.

A hydraulic-pressure-supply-destination selection section 130 is provided between the hydraulic pressure supply source 128 and loads (first mold clamping cylinder 21 and second mold clamping cylinder 34). The hydraulic-pressure-supply-destination selection section 130 supplies hydraulic pressure to any one of the first mold clamping cylinder 21 and second mold clamping cylinder 34. Namely, pressure oil is selectively sent to any one of the first mold clamping cylinder 21 and second mold clamping cylinder 34.

Figure 9:
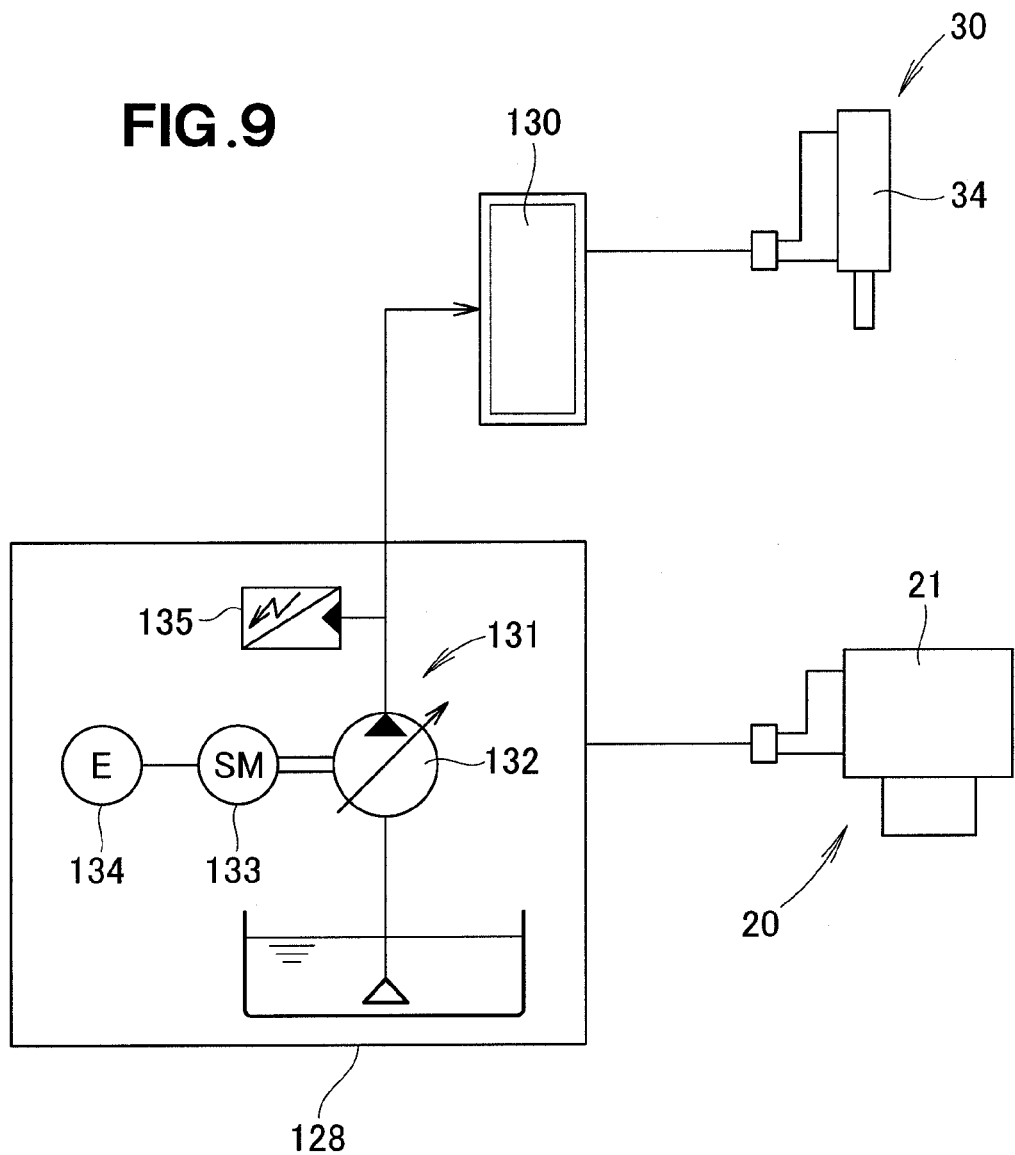
FIG. 9 is a detailed view of a hydraulic drive source in the injection molding apparatus of the present invention.

As shown in FIG. 9, a hydraulic pump 131, which is a principal component of the hydraulic pressure supply source 128, includes a pump section 132, and a servo motor 133 as a drive motor for rotationally driving the pump section 132. In this case, an AC servo motor (AC motor) connected to a servo circuit is used as the servo motor 133, and a rotary encoder 134 is connected to the servo motor 133 for detecting the number of rotations of the servo motor 133. A pressure sensor 135 is also provided for detecting discharge pressure of the pump section 132.

Thus, by variably controlling the number of rotations of the servo motor 133, the instant embodiment can enhance responsiveness of the hydraulic pump 131 but also vary a discharge flow rate and discharge pressure of the hydraulic pump 131, on the basis of which it can perform drive control on the first mold clamping cylinder 21 and second mold clamping cylinder 34. In the aforementioned manner, the instant embodiment can achieve enhanced energy conservation performance and reduced running cost, but also enhanced accuracy of control and enhanced operability of the injection molding apparatus.

Figure 10:
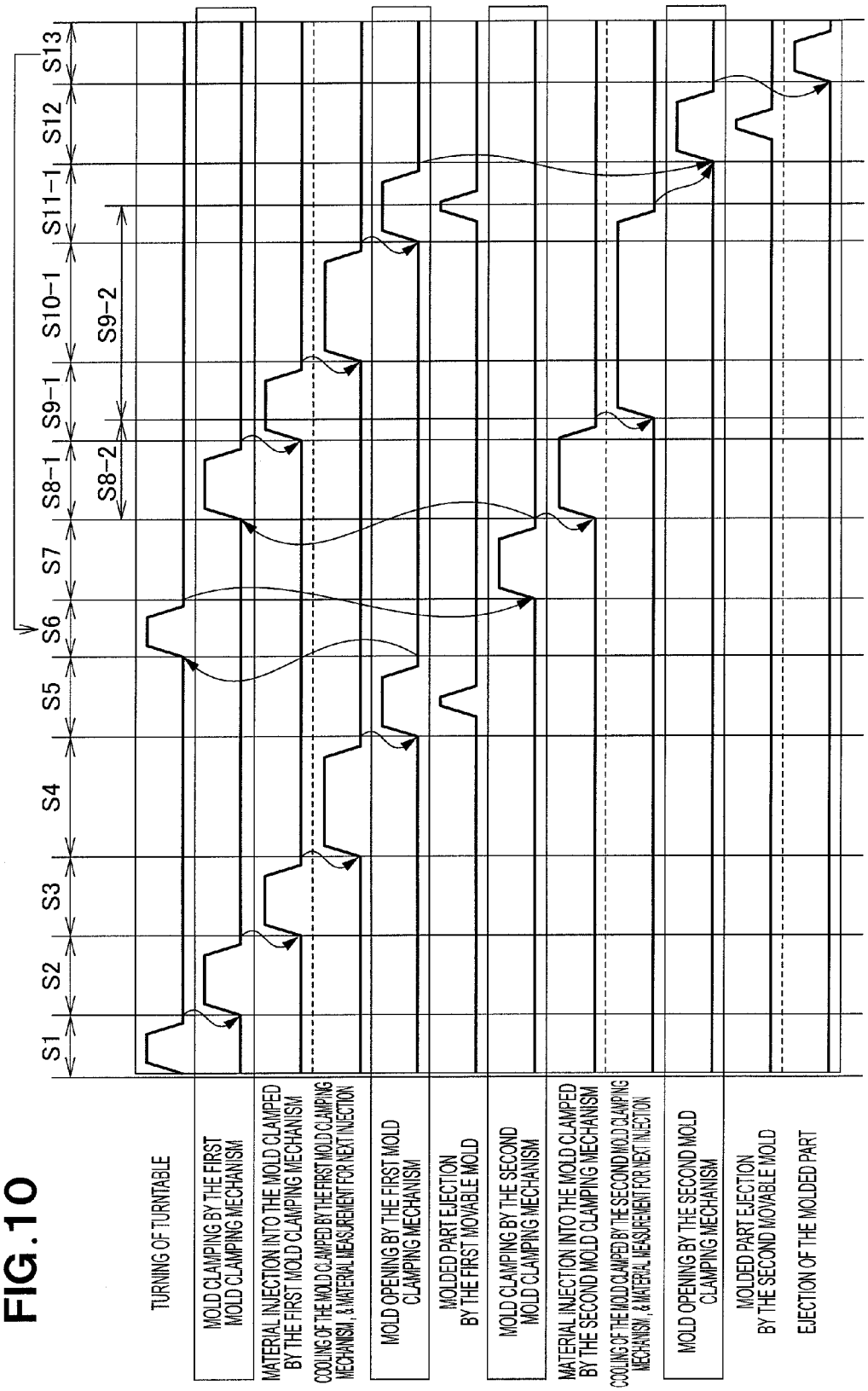
FIG. 10 is a time chart illustrating behavior of the injection molding apparatus of the present invention.

The following describe overall behavior of the embodiment of the injection molding apparatus 10 of the present invention. FIG. 10 is a time chart illustrating behavior of the injection molding apparatus 10, where step numbers S1 to S13 are plotted on the horizontal axis. S1 to S6 represent behavior from the start of operation of the injection molding apparatus 10 to the start of full-capacity operation of the injection molding apparatus 10, and S6 to S13 represent behavior in the full-capacity operation. Namely, the turntable 14 is turned at step S1, and mold clamping is performed by the first molding clamping mechanism 20 at step S2. Then, resin material (thermoplastic resin) is injected into the clamped mold (i.e., mold having been clamped by the first molding clamping mechanism 20) at step S3, cooling of the mold is performed, and measurement of the resin material for the next injection of the resin material is performed at step S4. Upon completion of the mold cooling, the mold is opened at step S5. At that time, ejection of the molded part or workpiece is performed by the first movable mold 26 in order to prevent the molded product from sticking to the upper mold.

Now that turning of the turntable 14 has been made possible, the turntable 14 is turned through 180 degrees at step S6. Then, mold clamping is performed by the second molding clamping mechanism 30 at step S7. Then, resin material (liquid resin) is injected into the clamped mold (i.e., molded having been clamped by the second molding clamping mechanism 30) at step S8-2, cooling of the mold is performed, and then measurement of the resin material (liquid resin) for the next injection is performed at step S9-2. Upon completion of the mold cooling, the mold is opened at step S12. At that time, ejection of the molded product is performed by the second movable mold 36 in order to prevent the molded product from sticking to the upper mold. Then, the molded product is ejected from the mold at step S13.

In parallel with the above, mold clamping is performed by the first mold clamping mechanism 20 at step S8-1, the resin material (thermoplastic resin) is injected into the clamped mold at step S9-1, cooling of the mold is performed, and then measurement of the resin material for the next injection is performed at step S10-1. Upon completion of the mold cooling, the mold is opened at step S11-1. At that time, ejection of the molded product is performed by the first movable mold 26 in order to prevent the molded product from sticking to the upper mold.

As clear from the figure, the mold clamping by the first mold clamping mechanism 20 at step S8-1 is started in response to a mold clamping completion signal generated at step S7, and the mold opening by the second mold clamping mechanism 30 at step S12 is started in response to a first mold opening completion signal generated at step S11-1. Such operations are carried out under control of the hydraulic-pressure-supply-destination selection section 130 (FIG. 8). Namely, control is performed by the hydraulic-pressure-supply-destination selection section 130 such that the operations of steps S7 and S8-1 do not overlap each other and the operations of steps S11-1 and S12 do not overlap each other.

The foregoing description may be summarized as follows. As shown in FIG. 8, the injection molding apparatus 10 includes: the plurality of mold clamping mechanisms 20 and 30; the single hydraulic pressure supply source 128 provided for supplying mold clamping hydraulic pressure to the plurality of mold clamping mechanisms 20 and 30; the hydraulic-pressure-supply-destination selection section 130 that makes a supply destination selection such that hydraulic pressure is supplied from the hydraulic pressure supply source 128 to one of the plurality of mold clamping mechanisms 20 or 30; the turntable 140 that shifts the molds 16 and 17 from one of the mold clamping mechanisms 20 and 30 to the other of the mold clamping mechanisms 30 or 20; the injecting machines 40 and 55 provided in association with respective ones of the plurality of mold clamping mechanisms 20 and 30 for injecting resin material to the molds 16 and 17 clamped by the mold clamping mechanisms 20 and 30; and the electric power supply source 126 or the compressed air supply source 127 provided for supplying electric power or compressed air to the injecting machines 40 and 55.

Namely, in the injection molding apparatus 10 including the plurality of mold clamping mechanisms 20 and 30 and the plurality of injecting machines 40 and 55, the mold clamping mechanisms 20 and 30 are driven by hydraulic pressure while the injecting machines 40 and 55 are driven by electric power or compressed air. In the case where only the mold clamping mechanisms 20 and 30 are driven by hydraulic pressure like this, the necessary capacity of the hydraulic pump can be lowered as compared to a case where all of the mold clamping mechanisms 20 and 30 and the injecting machines 40 and 55 are driven by hydraulic pressure.

Further, in the injection molding apparatus 10, the hydraulic-pressure-supply-destination selection section 130 allows hydraulic pressure to be supplied to a selected one of the mold clamping mechanisms 20 and 30. In the case where only a selected one of the mold clamping mechanisms 20 and 30 is driven at a time like this, the necessary capacity of the hydraulic pump 131 can be halved as compared to a case where the plurality of mold clamping mechanisms 20 and 30 are driven simultaneously. Thus, the instant embodiment can significantly lower or reduce the necessary capacity of the hydraulic pump 131 and thus can reduce the size of, or downsize, the hydraulic pump 131 but also significantly reduce electricity cost required for driving the hydraulic pump 131.

Further, as shown in FIG. 8, the injection molding apparatus 10 includes the ejection mechanisms 38, 124 and 125 for ejecting a molded product from the mold, and electric power or compressed air is supplied from the electric power supply source 126 or the compressed air supply source 127 to these ejection mechanisms 38, 124 and 125. Because driving by hydraulic pressure is not employed for the ejection mechanisms 38, 124 and 125, it is not necessary to increase the capacity of the hydraulic pump, so that further size reduction of the hydraulic pump 131 can be achieved.

Furthermore, in the instant embodiment, the resin material to be injected by the injecting machine 40 is thermoplastic resin, while the resin material to be injected by the other injecting machine 55 is non-thermoplastic resin different from the thermoplastic resin. By provision of the hydraulic-pressure-supply-destination selection section 130, mold clamping by the one mold clamping mechanism 20 and mold clamping by the other mold clamping mechanism 30 can be performed with a proper time difference therebetween or at proper non-overlapping timing, and mold opening by the one mold clamping mechanism 20 and mold opening by the other mold clamping mechanism 30 can be performed with a proper time difference therebetween or at proper non-overlapping timing. Thus, even different kinds of material that differ from each other in length of time necessary for being cooled within the respective molds can be used for injection molding by the injection molding apparatus 10, and thus, double-color molding etc. can be performed with ease by the injection molding apparatus 10.

The basic principles of the present invention are well suited for application to double-color molding apparatus.

Obviously, various minor changes and modifications of the present invention are possible in light of the above teaching. It is therefore to be understood that within the scope of the appended claims the invention may be practiced otherwise than as specifically described.

What is claimed is:

1. An injection molding apparatus comprising:
   a plurality of injection molds;
   a plurality of mold clamping mechanisms for clamping the respective plurality of injection molds;
   a turntable mounted to undergo turning movement for shifting the injection molds between the mold clamping mechanisms;
   a single hydraulic pressure supply source for supplying mold clamping hydraulic pressure to the plurality of mold clamping mechanisms;
   a hydraulic-pressure-supply-destination selection section for making a hydraulic-pressure supply destination selection such that hydraulic pressure is selectively supplied from the single hydraulic pressure supply source to any one of the plurality of mold clamping mechanisms;
   a plurality of injecting machines provided in association with the plurality of mold clamping mechanisms for injecting resin material to the injection molds clamped by corresponding ones of the mold clamping mechanisms; and
   an electric power supply source or a compressed air supply source provided for supplying driving electric power or compressed air to the plurality of injecting machines;
   wherein one of the injecting machines is configured for injecting a thermoplastic resin, and another of the injecting machines is configured for injecting a non-thermoplastic resin.

2. The injection molding apparatus according to claim 1, further comprising an ejection mechanism for ejecting a molded product from each of the injection molds, and wherein the driving electric power or compressed air is supplied from the electric power supply source or the compressed air supply source to the ejection mechanism.

3. The injection molding apparatus according to claim 1, wherein the single hydraulic pressure supply source is a hydraulic pump; and further comprising a drive motor that drives the hydraulic pump under a condition that a number of rotations of the drive motor is variably controlled to thereby vary a discharge flow rate of the hydraulic pump.

4. The injection molding apparatus according to claim 1; wherein the non-thermoplastic resin is liquid mixed material obtained by stirring and mixing liquid resin material and a curing agent.

5. The injection molding apparatus according to claim 1, wherein the plurality of mold clamping mechanisms comprises a first mold clamping mechanism including a first mold clamping cylinder, a first pressure receiving board drivable by the first mold clamping cylinder, first tie rods extending upward from the first pressure receiving board, and a first movable plate secured to and connecting the respective upper ends of the first tie rods; and a second mold clamping mechanism including second tie rods, a second pressure receiving board connecting respective upper ends of the second tie rods, a second movable plate connected to the second tie rods for movement between the turntable and the second pressure receiving board, and a second mold clamping cylinder connected to the second pressure receiving board for moving the second movable plate.

6. The injection molding apparatus according to claim 5, wherein the plurality of injection molds comprises first and second injection molds; wherein the first injection mold comprises a first movable mold mounted to the first movable plate of the first mold clamping mechanism and a first stationary mold mounted to the turntable; and wherein the second injection mold comprises a second movable mold mounted to the second movable plate of the second mold clamping mechanism and a second stationary mold mounted to the turntable.

7. The injection molding apparatus according to claim 6, wherein the turntable, the mold clamping mechanisms and the injection molds are configured so that in response to turning movement of the turntable, the first stationary mold angularly moves between a position under the first movable plate and a position under the second movable plate, and the second stationary mold angularly moves between a position under the second movable plate and a position under the first movable plate.

8. The injection molding apparatus according to claim 5, wherein the hydraulic-pressure-supply-destination selection section is provided between the hydraulic pressure supply source and the first and second mold clamping cylinders and is configured to make a hydraulic-pressure supply destination selection such that hydraulic pressure is selectively supplied from the single hydraulic pressure supply source to any one of the first and second mold clamping cylinders.

9. The injection molding apparatus according to claim 1, wherein the plurality of mold clamping mechanisms comprises a first mold clamping mechanism and a second mold clamping mechanism; and wherein the hydraulic-pressure-supply-destination selection section is configured to make the hydraulic-pressure supply destination selection so that mold clamping by the first mold clamping mechanism and mold clamping by the second mold clamping mechanism are performed with a time difference therebetween.

10. The injection molding apparatus according to claim 1, wherein the plurality of mold clamping mechanisms comprises a first mold clamping mechanism and a second mold clamping mechanism; and wherein the hydraulic-pressure-supply-destination selection section is configured to make the hydraulic-pressure supply destination selection so that mold opening by the first mold clamping mechanism and mold opening by the second mold clamping mechanism are performed with a time difference therebetween.

11. An injection molding apparatus comprising:
    at least two mold clamping mechanisms for clamping respective molds;
    a hydraulic pressure supply source for supplying hydraulic pressure to the at least two mold clamping mechanisms to clamp the respective molds;
    a hydraulic-pressure-supply-destination selection section configured to allow hydraulic pressure from the hydraulic pressure supply source to be selectively supplied to any one of the two mold clamping mechanisms;

at least two injecting machines for injecting resin material to the respective molds clamped by the respective two mold clamping mechanisms, one of the at least two injecting machines being configured for injecting a thermoplastic resin, and the other of the at least two injecting machines being configured for injecting a non-thermoplastic resin; and a non-hydraulic power supply source for driving the at least two injecting machines to inject the resin material.

12. The injection molding apparatus according to claim 11, wherein the non-hydraulic power supply source comprises an electric power supply source for supplying driving electric power to the at least two injecting machines.

13. The injection molding apparatus according to claim 11, wherein the non-hydraulic power supply source comprises a compressed air supply source for supplying compressed air to the at least two injecting machines.

14. The injection molding apparatus according to claim 11, further comprising a turntable mounted to undergo pivotal movement for shifting the molds between the respective mold clamping mechanisms.

15. The injection molding apparatus according to claim 11, wherein the hydraulic-pressure-supply-destination selection section is configured to allow hydraulic pressure from the hydraulic pressure supply source to be selectively supplied to any one of the two mold clamping mechanisms so that mold clamping by one of the at least two mold clamping mechanism and mold clamping by the other of the two mold clamping mechanisms are performed with a time difference therebetween.

16. The injection molding apparatus according to claim 11, further comprising an ejection mechanism for ejecting a molded product from each of the molds, the ejecting mechanism being driven by the non-hydraulic power supply source.

17. The injection molding apparatus according to claim 11, wherein the hydraulic pressure supply source comprises a hydraulic pump; and further comprising a drive motor that drives the hydraulic pump under a condition that a number of rotations of the drive motor is variably controlled to thereby vary a discharge flow rate of the hydraulic pump.

18. The injection molding apparatus according to claim 11, wherein one of the at least two mold clamping mechanisms comprises a first mold clamping mechanism including a first mold clamping cylinder, a first pressure receiving board drivable by the first mold clamping cylinder, first tie rods extending upward from the first pressure receiving board, and a first movable plate secured to and connecting the respective upper ends of the first tie rods; and wherein the other of the at least two mold clamping mechanisms comprises a second mold clamping mechanism including second tie rods, a second pressure receiving board connecting respective upper ends of the second tie rods, a second movable plate connected to the second tie rods for movement between the turntable and the second pressure receiving board, and a second mold clamping cylinder connected to the second pressure receiving board for moving the second movable plate.

19. The injection molding apparatus according to claim 18, further comprising a turntable mounted to undergo pivotal movement for shifting the molds between the respective mold clamping mechanisms; and wherein the molds comprise a first mold including a first movable mold mounted to the first movable plate and a first stationary mold mounted to the turntable, and a second mold including a second movable mold mounted to the second movable plate and a second stationary mold mounted to the turntable.

20. An injection molding apparatus comprising:

a first mold clamping mechanism for clamping a first mold;

a second mold clamping mechanism for clamping a second mold;

a single hydraulic pressure supply source for selectively supplying hydraulic pressure to the first mold clamping mechanism for performing a clamping operation to clamp the first mold and to the second mold clamping mechanism for performing a clamping operation to clamp the second mold;

a hydraulic-pressure-supply-destination selection section for making a hydraulic-pressure supply destination selection that controls the single hydraulic pressure supply source to selectively supply hydraulic pressure to the first and second mold clamping mechanisms with a time difference therebetween so that the clamping operations for clamping the first and second molds do not overlap each other;

a first injecting machine for injecting a thermoplastic resin to the first mold clamped by the first mold clamping mechanism;

a second injecting machine for injecting a non-thermoplastic resin to the second mold clamped by the second mold clamping mechanism; and a non-hydraulic power supply source for driving the first injecting machine to inject the thermoplastic resin to the first mold clamped by the first mold clamping mechanism and for driving the second injecting machine to inject the non-thermoplastic resin to the second mold clamped by the second mold clamping mechanism.

* * * * *